US011128741B2

(12) United States Patent
Zhang et al.

(10) Patent No.: US 11,128,741 B2
(45) Date of Patent: *Sep. 21, 2021

(54) AUTO-NEGOTIATION OVER EXTENDED BACKPLANE

(71) Applicant: Hewlett Packard Enterprise Development LP, Houston, TX (US)

(72) Inventors: Guodong Zhang, Plano, TX (US); Paul T. Vu, Roseville, CA (US); Michael Lee Witkowski, Tomball, TX (US); Robert R. Teisberg, Georgetown, TX (US); John V. Butler, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,159

(22) Filed: Nov. 18, 2019

(65) Prior Publication Data

US 2020/0084304 A1    Mar. 12, 2020

Related U.S. Application Data

(63) Continuation of application No. 15/500,086, filed as application No. PCT/US2014/067935 on Dec. 1, 2014, now Pat. No. 10,484,519.

(51) Int. Cl.
*H04L 29/06* (2006.01)
*H04L 12/64* (2006.01)
*H04L 12/931* (2013.01)

(52) U.S. Cl.
CPC .......... *H04L 69/24* (2013.01); *H04L 12/6418* (2013.01); *H04L 49/40* (2013.01); *H04L 69/18* (2013.01)

(58) Field of Classification Search
CPC ......... H04L 1/0009; H04L 1/16; H04L 12/12; H04L 12/4625; H04L 43/10; G06F 15/173; Y02D 50/42; Y02D 50/40
See application file for complete search history.

(56) References Cited

U.S. PATENT DOCUMENTS 5,627,788 A    5/1997   Chang et al.
6,181,619 B1   1/2001   Bogin et al.
(Continued)

FOREIGN PATENT DOCUMENTS

CN       1574751 A1    2/2005
CN     102394782 A     3/2012
(Continued)

OTHER PUBLICATIONS

Dr. Franz-Joachim Kauffels, "40GBase-T," (Research Paper), Apr. 23, 2009, 20 pages.
(Continued)

*Primary Examiner* — Aftab N. Khan
(74) *Attorney, Agent, or Firm* — Park, Vaughan, Fleming & Dowler LLP

(57) ABSTRACT

In one example in accordance with the present disclosure, a system for auto-negotiation over extended backplane includes an enclosure and a switch external to the enclosure. The enclosure has a NIC (network interface controller) for a server in the enclosure and a DEM (downlink extension module). The DEM has a single DEM PHY connected to the NIC via a backplane and also connected to the switch via an external connection. The DEM PHY facilitates auto-negotiation between the switch and the NIC.

20 Claims, 5 Drawing Sheets

(56) References Cited

U.S. PATENT DOCUMENTS

| | | | |
|---|---|---|---|
| 6,324,652 B1* | 11/2001 | Henderson | G06F 1/08 |
| | | | 713/500 |
| 6,516,352 B1* | 2/2003 | Booth | H04L 12/403 |
| | | | 370/463 |
| 6,618,392 B1 | 9/2003 | Bray | |
| 6,785,793 B2 | 8/2004 | Aboulenein et al. | |
| 6,799,241 B2 | 9/2004 | Kahn et al. | |
| 6,976,122 B1 | 12/2005 | Sander et al. | |
| 7,610,418 B2 | 10/2009 | Holland et al. | |
| 7,761,656 B2 | 7/2010 | Madrid et al. | |
| 8,284,771 B1 | 10/2012 | Julien et al. | |
| 8,406,128 B1 | 3/2013 | Brar et al. | |
| 8,495,194 B1 | 7/2013 | Brar et al. | |
| 8,607,225 B2 | 12/2013 | Stevens | |
| 8,619,483 B2 | 12/2013 | Katoch et al. | |
| 8,661,309 B2 | 2/2014 | Bliss et al. | |
| 8,880,739 B1 | 11/2014 | Brar et al. | |
| 2003/0161348 A1* | 8/2003 | Mills | H04L 12/12 |
| | | | 370/509 |
| 2004/0120210 A1 | 6/2004 | Lee | |
| 2004/0196728 A1 | 10/2004 | Matsuzaki | |
| 2004/0208180 A1* | 10/2004 | Light | H04L 1/0009 |
| | | | 370/395.2 |
| 2004/0257990 A1 | 12/2004 | Lingafelt et al. | |
| 2005/0002253 A1 | 1/2005 | Shi et al. | |
| 2005/0002390 A1 | 1/2005 | Kim et al. | |
| 2005/0055456 A1* | 3/2005 | Chalupsky | H04L 47/18 |
| | | | 709/233 |
| 2005/0138191 A1* | 6/2005 | Seto | H04L 29/06 |
| | | | 709/230 |
| 2006/0212636 A1 | 9/2006 | Yasuo | |
| 2007/0110088 A1 | 5/2007 | Kemp et al. | |
| 2007/0165663 A1* | 7/2007 | Aloni | H04L 41/12 |
| | | | 370/420 |
| 2008/0140819 A1 | 6/2008 | Bailey et al. | |
| 2008/0239858 A1 | 10/2008 | Rajan et al. | |
| 2009/0074001 A1 | 3/2009 | Kalkunte et al. | |
| 2009/0232151 A1 | 9/2009 | Furlong et al. | |
| 2010/0095185 A1 | 4/2010 | Ganga et al. | |
| 2011/0035498 A1* | 2/2011 | Shah | H04L 12/12 |
| | | | 709/226 |
| 2012/0272083 A1* | 10/2012 | Fujisawa | H04L 63/205 |
| | | | 713/323 |
| 2013/0235762 A1 | 9/2013 | Anantharam et al. | |
| 2014/0016637 A1 | 1/2014 | Masood et al. | |
| 2014/0032066 A1 | 1/2014 | Kanehara | |
| 2014/0115137 A1 | 4/2014 | Keisam | |
| 2015/0098473 A1 | 4/2015 | Hendel | |
| 2015/0271244 A1 | 9/2015 | Bloch et al. | |
| 2016/0373292 A1* | 12/2016 | Sigoure | H04L 41/0856 |
| 2017/0244817 A1 | 8/2017 | Zhang et al. | |

FOREIGN PATENT DOCUMENTS

| | | |
|---|---|---|
| EP | 2557739 A1 | 2/2013 |
| EP | 2688243 A1 | 1/2014 |
| EP | 3284218 A1 | 2/2018 |
| WO | 2004/021194 A2 | 3/2004 |
| WO | 2015/147840 A1 | 10/2015 |
| WO | 2017/065732 A1 | 4/2017 |

OTHER PUBLICATIONS

Extended European Search Report received for EP Patent Application No. 15906343.7, dated Feb. 12, 2018, 9 pages.

Freesacle Semiconductor Inc., "Initializing SDRAM Parameters for Motorola MPC106-based Systems," Rev. 0.1, Jun. 2003, 8 pages.

Mellanox Technologies Inc., "Realizing the Full Potential of Server, Switch & I/O Blades with Infiniband Architecture," 2009, pp. 1-11 pages.

Search Report and Written Opinion received for PCT Application No. PCT/US2014/067935, dated Aug. 11, 2015, 11 pages.

Search Report and Written Opinion received for PCT Patent Application No. PCT/US2015/055129, dated Jul. 12, 2016, 8 pages.

Search Report and Written Opinion received for PCT Patent Application No. PCT/US2015/055320, dated Jul. 13, 2016, 13 pages.

* cited by examiner

AUTO-NEGOTIATION OVER EXTENDED BACKPLANE

BACKGROUND

Various modern switches (e.g., Ethernet switches) continue to increase in scale, with more ports per switch and greater bandwidth per port.

BRIEF DESCRIPTION OF THE DRAWINGS

The following detailed description references the drawings, wherein.

DETAILED DESCRIPTION

Figure 1:
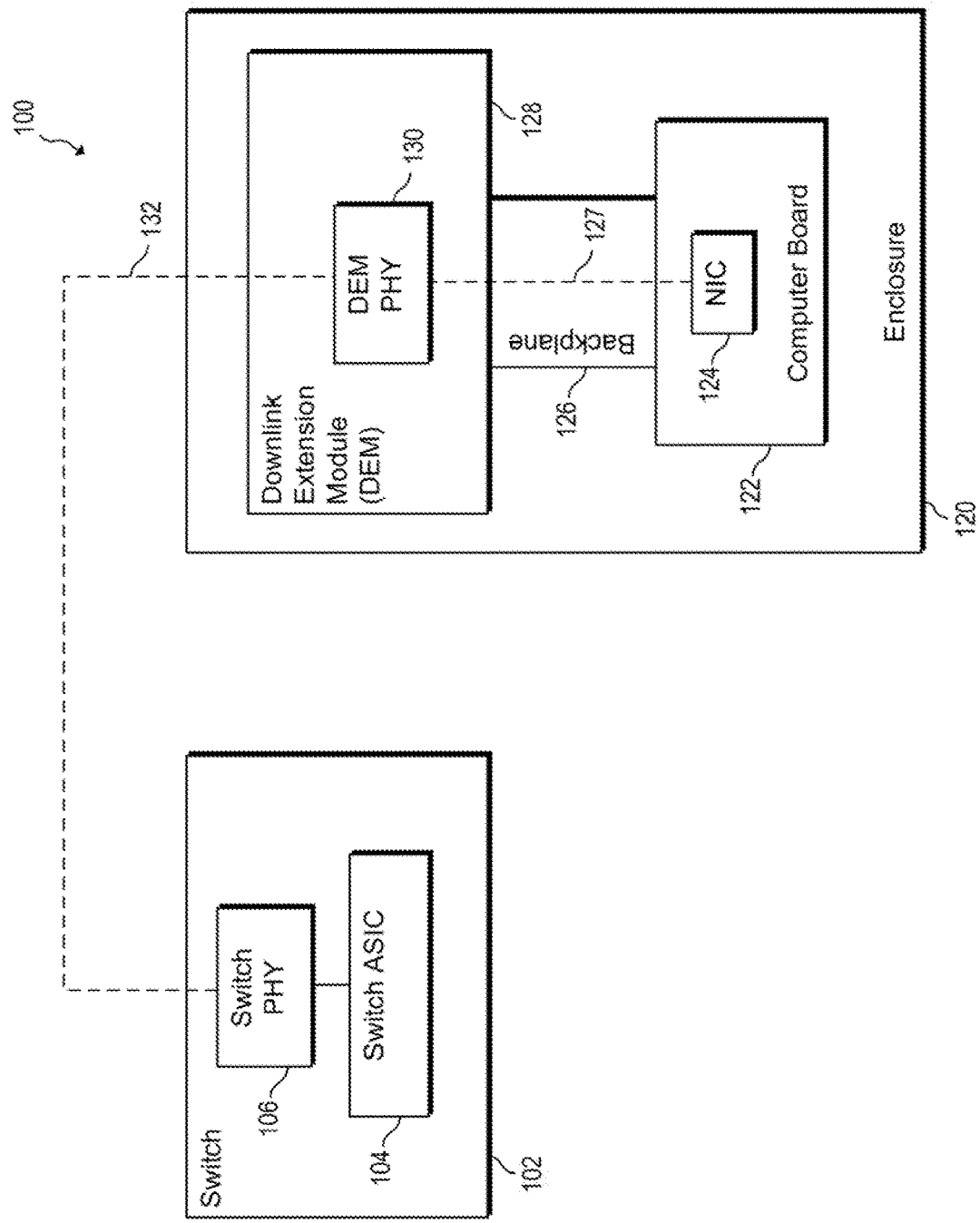
FIG. 1 is a block diagram of an example system for auto-negotiation over extended backplane.

As mentioned above, various modern switches (e.g., Ethernet switches) continue to increase in scale, with more ports per switch and greater bandwidth per port. However, in some server environments (e.g., blade servers), enclosure sizes are such that a relatively low number of servers are housed per enclosure, e.g., to support small data center environments. It may not be efficient for every enclosure to have its own high-powered switch.

In some situations, it may be desirable to create a network fabric solution that allows a number of the above mentioned enclosures to be used in a logical group. In some configurations, this may be done by stacking switches. In these configurations, each enclosure may include its own switch, and the switches may be linked together to support inter-enclosure communication. Among other issues, these configurations may utilize more switches than is desirable or efficient. Each enclosure may include a switch that is capable of handling traffic for many more servers than can fit in the enclosure. This may lead to many ports of the switches being unused and wasted. Furthermore, if multiple high-powered switches are necessarily used, space, power and money may be unnecessarily expended. High powered switches are relatively large, expensive and power-hungry, and may experience higher latency than may a simpler circuit (e.g., a DEM as described below). Additionally, such switches may need to be managed (e.g., with management software or additional control chip).

It may be desirable to reduce the number of switches used when creating a logical group of enclosures. In some examples, the connectivity of a single switch (e.g., in one enclosure) may be "extended" such that servers in other enclosures can utilize the switch (e.g., use the switch's spare ports). In these examples, for an enclosure to utilize a switch that is external to the enclosure, the enclosure may include a Downlink Extension Module (DEM) that connects to a backplane of the enclosure and also connects to the switch via an external connection. The DEM provides a datapath between a NIC (network interface controller) of a server in the enclosure and the external switch. In these examples, the DEM may include two PHYs. The term PHY is used to refer to a circuit implementing the physical layer of the Open System Interconnection (OSI) seven-layer network model, e.g., a physical computer chip. In these two-PHY examples, one PHY may communicate with the external switch via the external connection and the other PHY may communicate with the NIC via the backplane (backplane connection). The external connection may be via one or more copper or optical cables/connectors and the backplane connection may be via copper backplane traces/connectors. For the external connection and the backplane connection, two different interfacing technologies (or communication protocols) may be used. For example, for external connections over copper or optical cables, IEEE 802.3ba specifies Clause 86 (for 40GBASE-SR4) and Clause 86 (for 40GBASE-CR4). For backplane connections, IEEE 802.3ba specifies Clause 84 (for 40GBASE-KR4).

In the above mentioned two-PHY examples, the mixture of physical communication media in the datapath and the mixture of communication protocols pose a challenge. Various PHY devices that may be used in such a DEM support only auto-negotiation across one communication medium/protocol. Auto-negotiation is a communication procedure (e.g., an Ethernet procedure) by which two connected devices choose common transmission parameters, such as speed, duplex mode, and flow control. In this procedure, the connected devices first share their capabilities regarding these parameters and then choose the highest performance transmission mode they both support. In the two-PHY examples described above, the two PHYs (one that supports each type of communication media/protocol) must be connected in a back to back manner. This configuration does not support auto-negotiation across the entire datapath from NIC to switch. If communication is desired across the datapath (i.e., over both PHYs), manual configuration may be required, for example, management software or an additional control chip external to the DEM PHY may be needed to bridge the two PHYs. Additional management components and/or control chips to detect, setup, and ensure that the two different connections are established at the same speed, abilities, etc. adds complexity in hardware and software, raises reliability risks, and increases the cost of the solution.

The present disclosure describes auto-negotiation over a extended backplane. According to the present disclosure, a system may include an enclosure (e.g., a blade enclosure) and a switch external to the enclosure. The enclosure may include a NIC (network interface controller) for a server in the enclosure. The enclosure may include a DEM (downlink extension module) that provides a datapath between the NIC and the switch. The DEM has a single PHY (referred to as a DEM PHY) in the datapath. The DEM PHY is connected to the NIC via a backplane and also connected to the switch via an external connection. The DEM PHY facilitates auto-negotiation between the switch and the NIC by bridging a first communication protocol used over the backplane and a second communication protocol used over the external connection. The DEM PHY facilitates the auto-negotiation completely in-band, without the use of management software or any other control chip external to the DEM PHY, which would add complexity, timing variations and synchronization issues. According to the present disclosure, multiple enclosures may be connected to a single switch, thereby extending the functionality of the switch. Because DEMs are utilized in the enclosures instead of additional switches, this solution lowers costs, reduces power and reduces latency. This allows for improved scalability, better performance.

FIG. 1 is a block diagram of an example system 100 for auto-negotiation over extended backplane. System 100 may include a switch 102 and an enclosure 120 (e.g., a blade enclosure). System 100 may include any number of enclosures connected to switch 102; however, for ease of description, one enclosure will be described with reference to FIG. 1. Enclosure 120 may be connected to switch 102 via an external connection (e.g., connection 132), for example, via one or more copper or optical cables. Each optical cable may have at least one optical connector on each end as well. Connection 132 may connect to the switch 102 on one end, and to a DEM (128) in the enclosure on the other end. Connection 132 may be various other types of communication media (e.g., wired or wireless) in other examples; however, for ease of description, the following examples will describe an external connection that is one or more copper or optical cables.

Switch 102 may provide network access to multiple components (e.g., to at east one server in enclosure 120 and perhaps to other servers in other enclosures). Switch 102 may include a switch ASIC (application-specific integrated circuit) 104 that performs the particular processing tasks of the switch 102. Switch 102 may include at least one switch PHY (e.g., 106). Each switch PHY may provide an interface between a port of the switch and the switch ASIC 104. In the particular example of FIG. 1, switch PHY 106 provides an interface between a port of switch 102 (the port being connected to enclosure 120) and switch ASIC 104. Switch PHY 106 may be a physical computer chip that includes electronic circuitry (i.e., hardware) that implements the functionality of the PHY. Switch PHY 106 may also include instructions (e.g., firmware) that, when executed by the circuitry of switch PHY 106, implements the functionality of the PHY. In some examples, switch PHY 106 may be included as part of switch ASIC 104 (e.g., a single circuit, chip, etc.) and in other examples, switch PHY 106 may be separate from ASIC 104.

Switch 102, may, in some examples, be included in an enclosure (e.g., separate from enclosure 120), as is explained in more detail below with regard to FIG. 2A. In other examples, switch 102 may be a top-of-rack (ToR) switch (e.g., as shown in FIG. 2B) or other standalone switch.

Enclosure 120 may house at least one server that gains network access by ultimately connecting with switch 102. Enclosure 120 includes a NIC (network interface controller) of a server. In the example of FIG. 1, NIC 124 is shown attached to a computer board 122. Computer board 122 may also include the various components of the server, or computer board 122 may be a computer card of sorts that houses NIC 124 and then interfaces with a different computer board that includes the various components of the server. In any case, NIC 124 provides the server with network access. Enclosure 120 may include a backplane 126 that is essentially a computer bus that acts as a backbone to connect several computer components together. In some examples, a backplane (e.g., 126) may connect a NIC (e.g., 124) to a switch of the enclosure (e.g., 120). In the example of FIG. 1, however, enclosure 120 may not include its own switch. In this example, backplane 126 connects NIC 124 to a DEM (downlink extension module) 128, which in turn, connects to an external switch (102). DEM 128 provides a datapath between NIC 124 (in enclosure 120) and the external switch 102. Thus, connection 132 is sometimes referred to as an "extended backplane." Via an extended backplane, functionality of a switch (e.g., 102) may be extended to severs in enclosures (e.g., 120) that are external to the switch.

DEM 128 includes a single PHY (DEM PHY 130) in the datapath between switch 102 and NIC 124, as opposed to the examples described above that use two PHYs in the DEM. DEM PHY 130 communicates with the external switch 102 via external connection 132. DEM PHY 130 also communicates with NIC 124 via backplane 126 (via backplane connection 127). Whereas external connection 132 may be via one or more copper or optical cables/connectors, backplane connection 127 may be via copper backplane traces/connectors. As described above, the external connection 132 and the backplane connection 127 may use different interfacing technologies (or communication protocols). For example, external connection 132 may abide by IEEE 802.3ba Clause 86 (for 40GBASE-SR4) or Clause 85 (for 40GBASE-CR4), Backplane connection 127 may abide by IEEE 802.3ba Clause 84 (for 40GBASE-KR4), for example. The single PHY (DEM PHY 130) may handle both of these different interfacing technologies (communication protocols). DEM PHY 130 may be capable of auto-negotiation with switch 102, and may also be capable of auto-negotiation with NIC 124, even though each of these connections may use a different communication protocol.

DEM PHY 130 may be a physical computer chip that includes electronic circuitry (i.e., hardware) that implements the functionality of the PHY. DEM PHY 130 may also include instruction (e.g., firmware) that, when executed by the circuitry of DEM PHY 130, implements the functionality of the PHY. In some examples, DEM PHY 130 may be configured (e.g., via hardware design and/or firmware programming) to handle both the interface/connection to switch 102 and the interface/connection to NIC 124, even though both of these connections use different communication protocols. Specifically, DEM PHY may be configured to facilitate an end-to-end auto-negotiation scheme between switch 102 and NIC 124, and may be configured to bridge these two different interfaces/connections (i.e., external connection and backplane connection).

DEM PHY 130 may be configured to listen for and receive (over backplane connection 127) auto-negotiation information (e.g., capabilities) from NIC 124. DEM PHY 130 may then "pass through" these capabilities and "advertise" them (over external connection 132) to switch 102 (e.g., specifically, to switch PHY 106), whereas some chips, when receiving auto-negotiation capabilities may attempt to interpret the capabilities and then complete the auto-negotiation process with the initiating component. Switch 102 (e.g., switch PHY 106, and then switch ASIC 104) may then receive the auto-negotiation capabilities of NIC 124 and may, in turn, send its auto-negotiation capabilities (e.g., the auto-negotiation capabilities of switch ASIC 104) back to DEM PHY 130. DEM PHY 130 may then complete the auto-negotiation process with NIC 124 and with switch 102. In order to carry out the above described process, DEM PHY 130 may need to maintain or remember the "state" of the auto-negotiation process for NIC 124 and switch 102, so that DEM PHY 130 can then complete the auto-negotiation process with each of these end points. More details of this auto-negotiation process performed over an extended backplane are provided below with regard to the description of method 300 of FIG. 3.

DEM PHY 130 may perform auto-negotiation over an extended backplane as just described, and may do so completely "in band." In band signaling refers to the sending of information within the same band or channel used for the main purpose of the channel. In this example, the "channel" may be the datapath between switch 102 and NIC 124, and the main purpose of this channel/datapath may be to pass networking information. DEM PHY 130 may perform auto-negotiation completely "in band" by using the same cabling, traces, etc. in the datapath that are used to pass networking information. DEM PHY 130 may perform auto-negotiation without the use of management software or any other control chip external to the DEM PHY or any other high layer software.

Figure 2A:
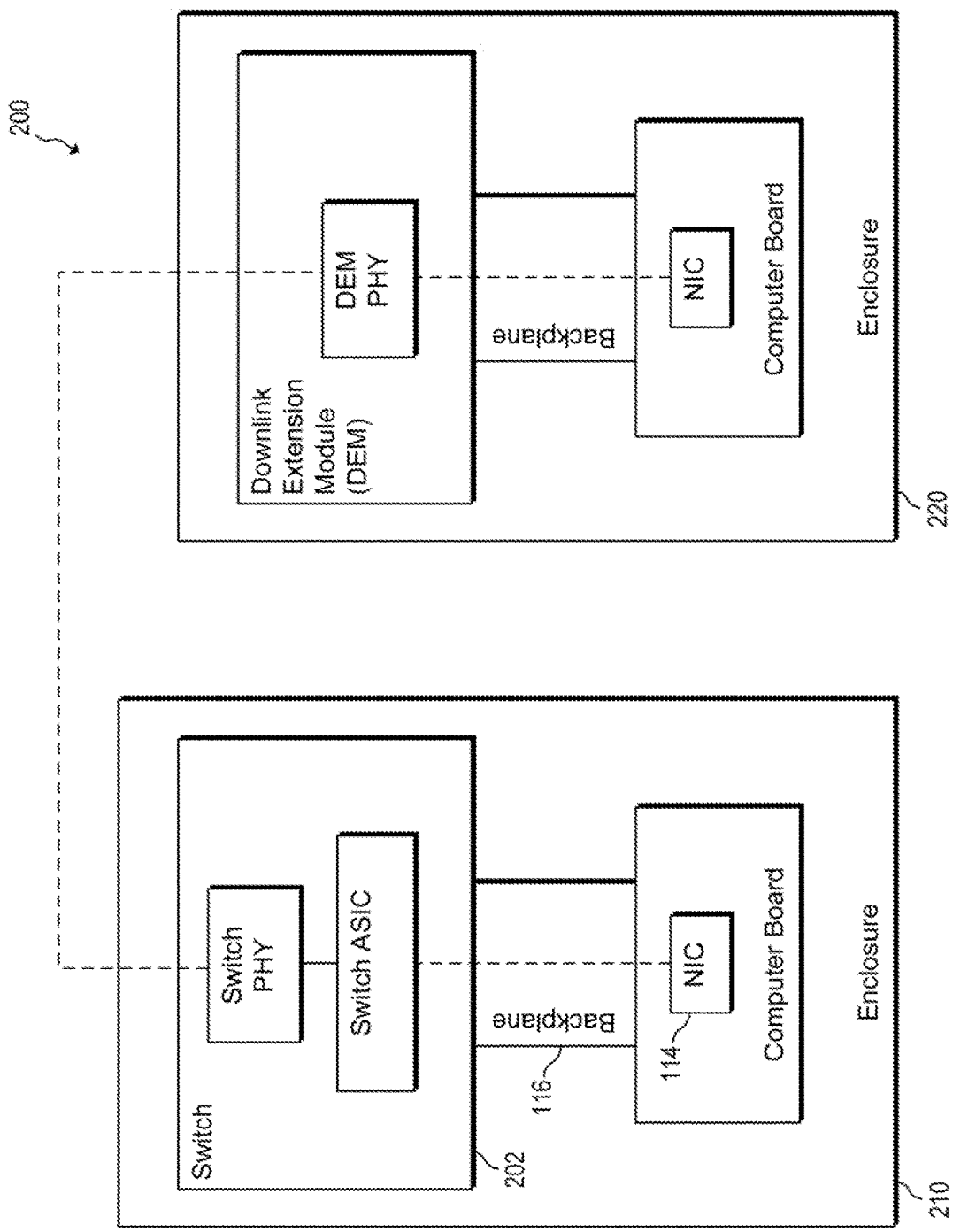
FIG. 2A is a block diagram of an example system for auto-negotiation over extended backplane.
Figure 2B:
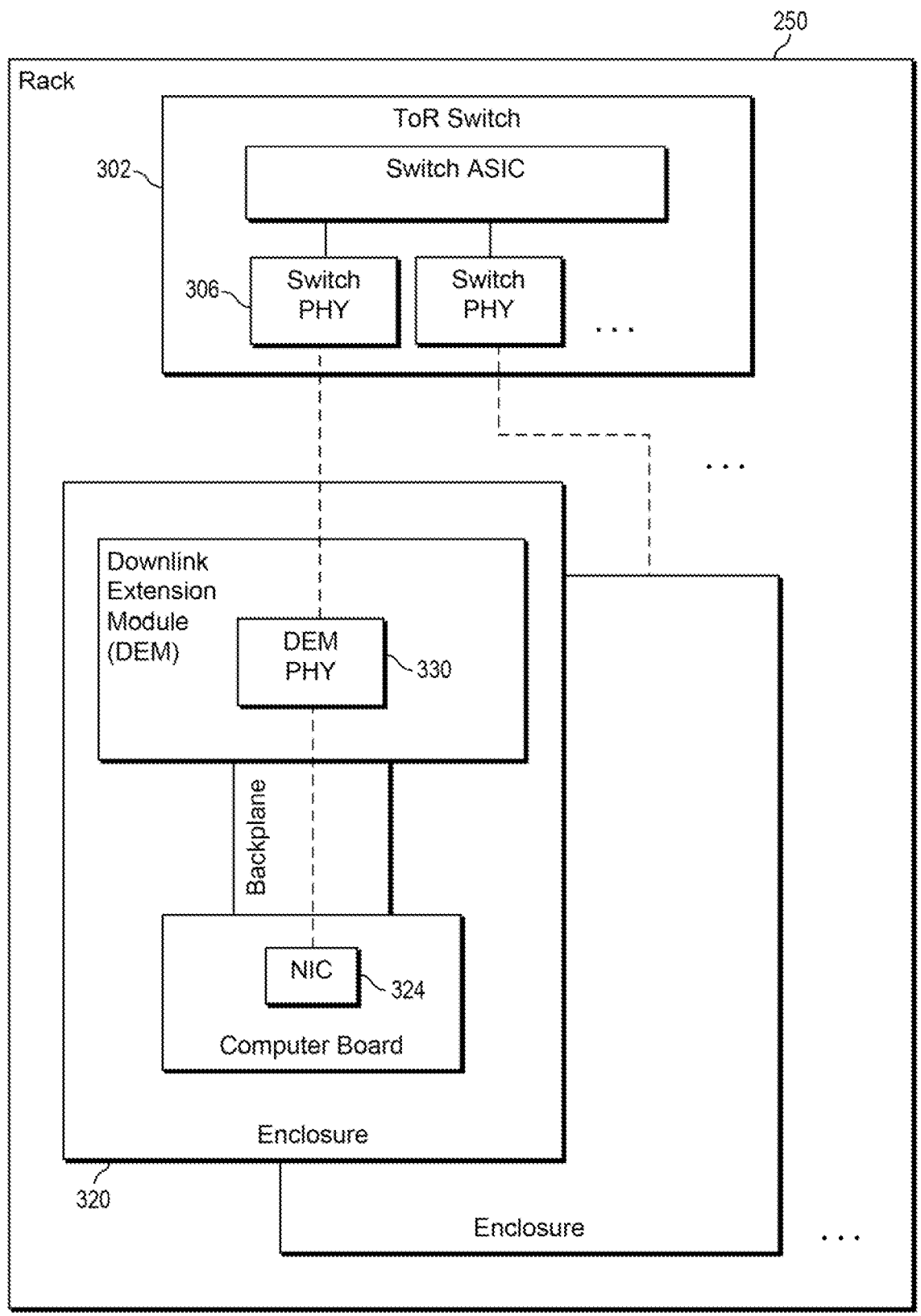
FIG. 2B is a block diagram of an example rack capable of supporting auto-negotiation over extended backplane.

FIG. 2A is a block diagram of an example system 200 for auto-negotiation over extended backplane. System 200 includes a first enclosure 210 and a second enclosure 220. Enclosure 220 may be similar to enclosure 120 of FIG. 1, where like-named components and associated described behaviors are similar. Enclosure 210 may include a switch 202 that is similar to switch 102 of FIG. 1, where like-named components and associated described behaviors are similar. Enclosure 210 may also include a NIC 114 that is connected to switch 202 via a backplane 116 in a manner similar to how NIC 124 of FIG. 1 is connected to DEM 128 via backplane 126. In this example of FIG. 2A, switch 202 of enclosure 210 may "extended" to a server in enclosure (e.g., 220) in a manner similar to how the capabilities of switch 102 may be extended to servers in enclosure 120, as described above.

FIG. 2B is a block diagram of an example rack 250 capable of supporting auto-negotiation over extended backplane. Rack 250 includes at least one enclosure, for example, enclosure 320. Enclosure 320 may be similar to enclosure 120 of FIG. 1, where like-named components and associated described behaviors are similar. Rack 250 includes a ToR (top of rack) switch 302, which in many respects may be similar to switch 102 of FIG. 1, where like-named components and associated described behaviors are similar. ToR switch 302 may include at least one switch PHY (e.g., 306). Each switch PHY may be associated with a port of the ToR switch, e.g., where each port is connected to a DEM PHY (e.g., 330) associated with a NIC of a serer (e.g., in enclosure 320 or another enclosure inside rack 250). In this example of FIG. 2B, ToR switch 302 may provide network access to servers in various enclosures of the rack 250. According to the solutions described herein, various DEM PHYs (e.g., 330) in rack 250 may allow for auto-negotiation over extended backplane such that various NICs (e.g., 324) may auto-negotiation with ToR switch 302 as is described in more detail herein.

Figure 3:
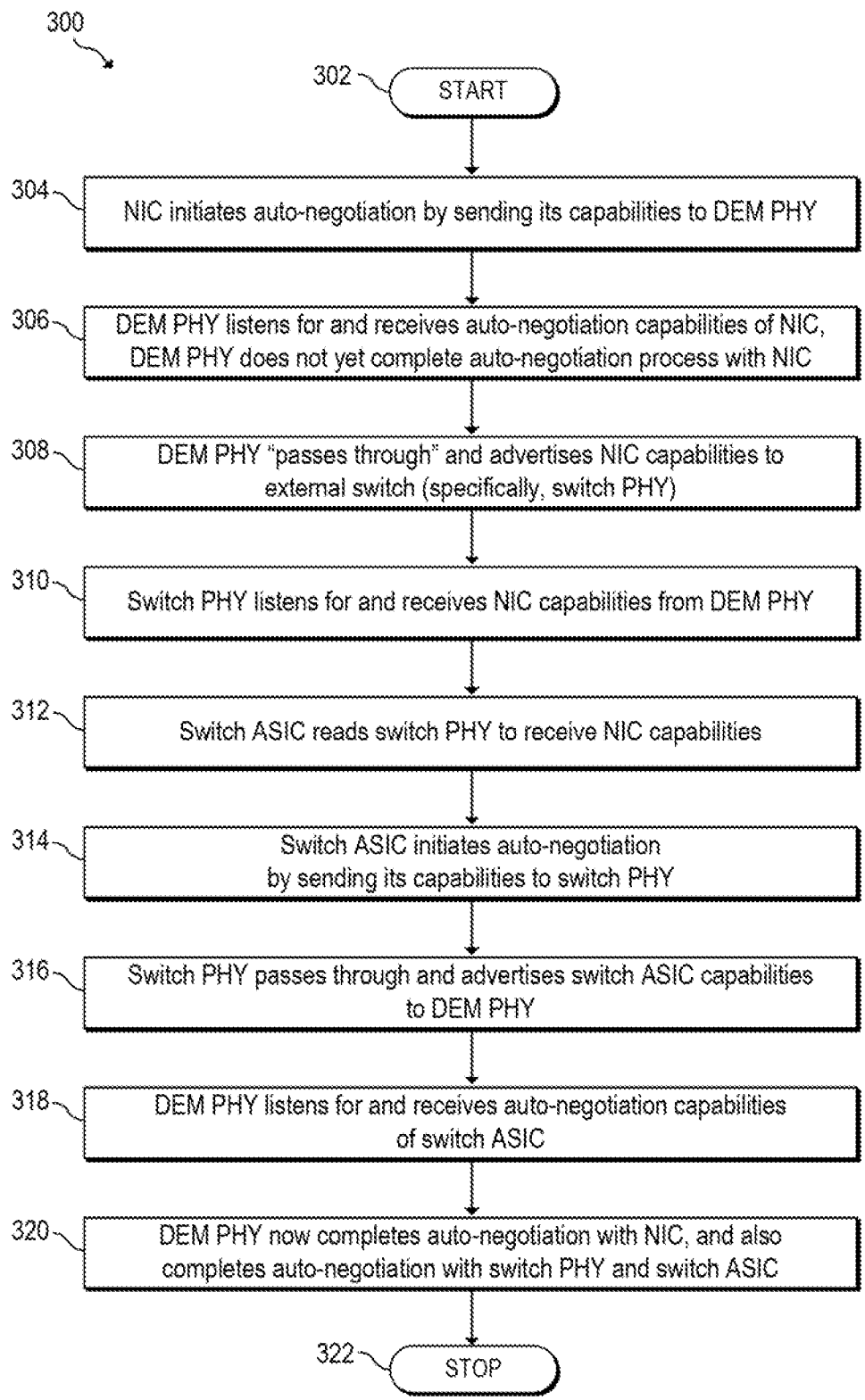
FIG. 3 is a flowchart of an example method for a auto-negotiation ever extended backplane.

FIG. 3 is a flowchart of an example method 300 for auto-negotiation over extended backplane. Method 300 may be described below as being executed or performed by a system, for example, system 100 of FIG. 1. Other suitable systems may be used as well. Method 300 may be implemented in the form of electronic circuitry (e.g., hardware). In some examples, method 300 may be implemented as a combination of electronic circuitry and executable instructions (e.g., firmware) executed by at least one processor of the system. In alternate embodiments of the present disclosure, one or more steps of method 300 may be executed substantially concurrently or in a different order than shown in FIG. 3. In alternate embodiments of the present disclosure, method 300 may include more or less steps than are shown in FIG. 3. In some embodiments, one or more of the steps of method 300 may, at certain times, be ongoing and/or may repeat.

Method 300 may start at step 302 and continue to step 304, where a NIC (e.g., 124) for a server in an enclosure (120) of the system may initiate auto-negotiation by sending its capabilities to a DEM (downlink extension module) PHY (e.g., 130) included in a DEM (e.g., 128) of the enclosure. The DEM PHY may be connected to the NIC via a backplane (e.g., 126, 127). The NIC may be configured to communicate according to a first communication protocol for a backplane connection (e.g., 10Base-KR, 20GBase-KR2, 40GBase-KR4, etc.) and to perform auto-negotiation. At step 306, the DEM PHY may listen for and receive the auto-negotiation capabilities of the NIC; however, the DEM PHY may not at this time complete the auto-negotiation process with the NIC. At step 308, the DEM PHY may pass through and advertise the auto-negotiation capabilities of the NIC to a switch (e.g., 102) external to the enclosure. More specifically, the auto-negotiation capabilities of the NIC may be sent to a switch PHY (e.g., 106) of the switch. The DEM PHY may be connected to the switch (i.e., the switch PHY) via an external connection (e.g., 132) that uses a second communication protocol.

At step 310, the switch PHY may listen for and receive the auto-negotiation capabilities of the NIC from the DEM PHY and may store these capabilities. At step 312, a switch ASIC (e.g., 104) of the switch may read the switch PHY to receive the NIC capabilities. At step 314, the switch ASIC (e.g., in response to receiving the NIC capabilities) may initiate auto-negotiation by sending its capabilities to the switch PHY. At step 316, the switch PHY may pass through and advertise the switch ASIC capabilities to the DEM PHY. At step 318, the DEM PHY may listen for and receive the auto-negotiation capabilities of the switch (e.g., of the switch ASIC. The DEM PHY now has (e.g., stored temporarily) the auto-negotiation capabilities of the NIC and of the switch (e.g., the switch ASIC). The DEM PHY also remembers the "state" of the auto-negotiation process for the NIC and the switch. At step 320, the DEM PHY may complete auto-negotiation with the NIC and with the switch to facilitate end-to-end auto-negotiation between the NIC and the switch. Completing auto-negotiation with the switch may include passing auto-negotiation data back to the switch PHY and in turn on to the switch ASIC. At this time, the end-to-end link between the switch (e.g., the switch ASIC) and the NIC is established. The switch has automatically adapted to the speed of the NIC (i.e., auto-negotiation) over the extended backplane as if the NIC were directly connected to the switch (e.g., over a standard backplane). Method 300 may eventually continue to step 322, where method 300 may stop.

Figure 4:
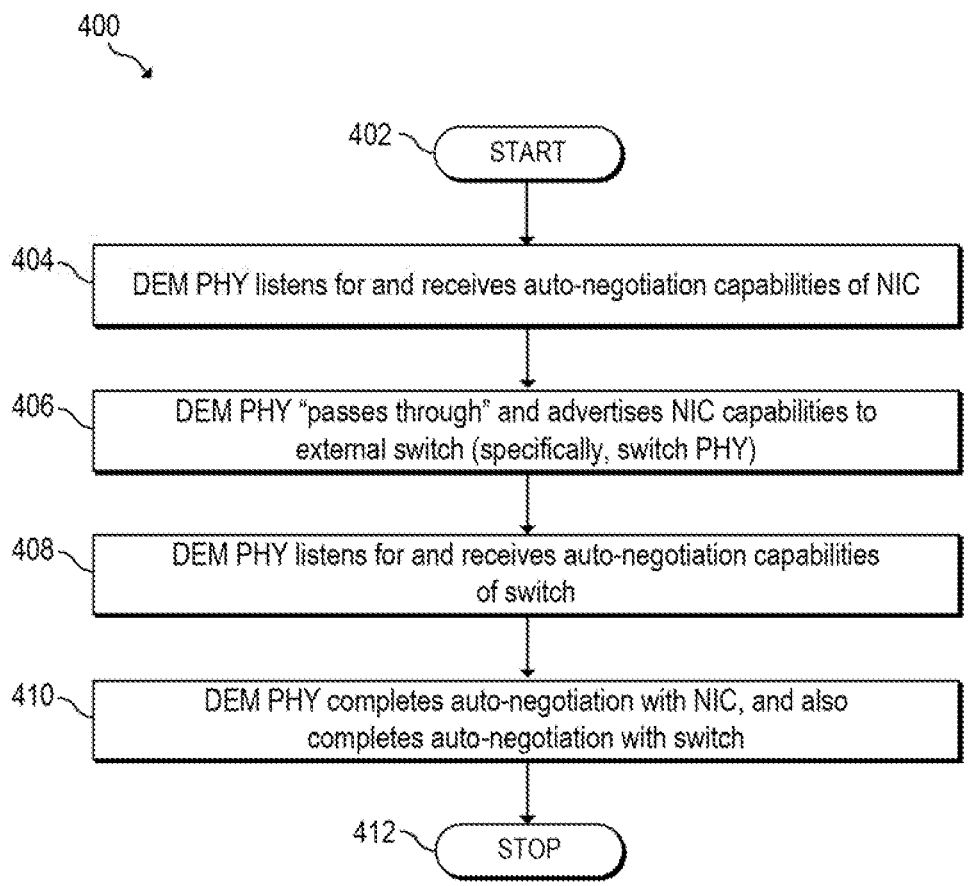
FIG. 4 is a flowchart of an example method for auto-negotiation over extended backplane.

FIG. 4 is a flowchart of an example method 400 for auto-negotiation over extended backplane. In some examples, method 400 may be executed or performed by a system, for example, system 100 of FIG. 1. In some examples, method 400 may be executed or performed by an enclosure, for example, enclosure 120 of FIG. 1. Other suitable systems or enclosures may be used as well. Method 400 may be implemented, in the form of electronic circuitry (e.g., hardware). In some examples, method 400 may be implemented as a combination of electronic circuitry and executable instructions (e.g., firmware) executed by at least one processor of the system or enclosure. In alternate embodiments of the present disclosure, one or more steps of method 400 may be execute substantially concurrently or in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Method 400 may start at step 402 and continue to step 404, where DEM PHY (e.g., 130) may listen for and receive auto-negotiation capabilities of a NIC (e.g., 124) for a server. The DEM PHY and the NIC may be included in an enclosure (e.g., 120) and connected to each other via a backplane (e.g., 126) that uses a first communication protocol. At step 406, the DEM PHY may pass through and advertise the auto-negotiation capabilities of the NIC to a switch (e.g., 102) external to the enclosure. The DEM PHY may be connected to the switch via an external connection (e.g., 132) that uses a second communication protocol. At step 408, the DEM PHY may listen for and receive auto-negotiation capabilities of the switch. At step 410, the DEM PHY may complete auto-negotiation with the NIC and with the switch to facilitate auto-negotiation between the NIC and the switch.

The invention claimed is:

1. An enclosure, comprising:
   a NIC (network interface controller) for a server in the enclosure;
   a backplane; and
   a DEM (downlink extension module) comprising a physical layer (PHY) unit coupled to the NIC via the backplane and a switch via an external connection, wherein the switch is external to the enclosure;
   wherein the PHY unit is to:
   receive information indicating auto-negotiation capabilities of the switch;
   advertise information indicating respective capabilities of the switch and the NIC to each other; and
   auto-negotiate transmission parameters between the switch and the NIC by bridging a first communication protocol used over the backplane and a second communication protocol used over the external connection, thereby adapting to the capabilities of the NIC over the backplane.

2. The enclosure of claim 1, wherein the PHY unit facilitates the auto-negotiation in-band in a data path between the switch and the NIC.

3. The enclosure of claim 1, wherein the PHY unit, in response to receiving the information indicating the capabilities of the NIC, is further to defer completion of the auto-negotiation to the NIC until receiving the capabilities of the switch.

4. The enclosure of claim 1, wherein the switch is included in a second enclosure, and wherein the switch is connected, via a second backplane of the second enclosure, to a second NIC for a second server in the second enclosure.

5. The enclosure of claim 1, wherein the switch is a ToR (top of rack) switch.

6. The enclosure of claim 1, wherein the PHY unit is further to listen for the information indicating the auto-negotiation capabilities of the switch.

7. The enclosure of claim 1, wherein the advertised capabilities of the switch include physical layer capabilities.

8. A downlink extension module (DEM), comprising:
   communication circuitry; and
   a physical layer (PHY) unit coupled to:
   a NIC (network interface controller) for a server in the enclosure via a backplane of the enclosure, and
   a switch via an external connection, wherein the switch is external to the enclosure;
   wherein the PHY unit is to:
   receive information indicating auto-negotiation capabilities of the switch;
   advertise information indicating respective capabilities of the switch and the NIC to each other; and
   auto-negotiate transmission parameters between a the NIC and the switch by bridging a first communication protocol used over the backplane and a second communication protocol used over the external connection, thereby adapting to the capabilities of the NIC over the backplane.

9. The DEM of claim 8, wherein the PHY unit facilitates the auto-negotiation in-band in a data path between the switch and the NIC.

10. The DEM of claim 8, wherein the PHY unit, in response to receiving the information indicating the capabilities of the NIC, is further to defer completion of the auto-negotiation to the NIC until receiving the capabilities of the switch.

11. The DEM of claim 8, wherein the switch is included in a second enclosure, and wherein the switch is connected, via a second backplane of the second enclosure, to a second NIC for a second server in the second enclosure.

12. The DEM of claim 8, wherein the switch is a ToR (top of rack) switch.

13. The DEM of claim 8, wherein the PHY unit is further to listen for the information indicating the auto-negotiation capabilities of the switch.

14. The DEM of claim 8, wherein the advertised capabilities of the switch include physical layer capabilities.

15. A method for auto-negotiation over a backplane of an enclosure, the method comprising:
   identifying, by a DEM (downlink extension module), a NIC (network interface controller) for a server, wherein a physical layer (PHY) unit of the DEM and the NIC are in the enclosure and coupled via the backplane;
   identifying, by the DEM, a switch external to the enclosure, wherein the PHY unit is coupled to the switch via an external connection;
   receiving, by the PHY unit, information indicating auto-negotiation capabilities of the switch;
   advertising, by the PHY unit, information indicating respective capabilities of the switch and the NIC to each other; and
   auto-negotiating, by the PHY unit, transmission parameters between the NIC and the switch by bridging a first communication protocol used over the backplane and a second communication protocol used over the external connection, thereby adapting to the capabilities of the NIC over the backplane.

16. The method of claim 15, further comprising deferring, by the PHY unit, completion of the auto-negotiation to the NIC until receiving the capabilities of the switch in response to receiving the capabilities of the NIC.

17. The method of claim 15, further comprising facilitating, by the PHY unit, the auto-negotiation in-band in a data path between the switch and the NIC.

18. The method of claim 15, wherein the switch is included in a second enclosure, and wherein the switch is connected, via a second backplane of the second enclosure, to a second NIC for a second server in the second enclosure.

19. The method of claim 15, further comprising listening, by the PHY unit, for the information indicating the auto-negotiation capabilities of the switch.

20. The method of claim 15, wherein the switch is a ToR (top of rack) switch.

* * * * *